(12) United States Patent
Blanton

(10) Patent No.: US 12,380,250 B2
(45) Date of Patent: Aug. 5, 2025

(54) METHOD FOR SECURING LOGIC CIRCUITS

(71) Applicant: CARNEGIE MELLON UNIVERSITY, Pittsburgh, PA (US)

(72) Inventor: Ronald D. Blanton, Pittsburgh, PA (US)

(73) Assignee: CARNEGIE MELLON UNIVERSITY, Pittsburgh, PA (US)

( * ) Notice: Subject to any disclaimer, the term of this patent is extended or adjusted under 35 U.S.C. 154(b) by 307 days.

(21) Appl. No.: 17/637,889

(22) PCT Filed: Aug. 28, 2020

(86) PCT No.: PCT/US2020/048380
§ 371 (c)(1),
(2) Date: Feb. 24, 2022

(87) PCT Pub. No.: WO2021/041793
PCT Pub. Date: Mar. 4, 2021

(65) Prior Publication Data
US 2022/0284132 A1   Sep. 8, 2022

Related U.S. Application Data

(60) Provisional application No. 62/922,828, filed on Aug. 29, 2019.

(51) Int. Cl.
G06F 21/72 (2013.01)
G06F 21/75 (2013.01)
H04L 9/06 (2006.01)
H04L 9/14 (2006.01)

(52) U.S. Cl.
CPC .............. *G06F 21/72* (2013.01); *G06F 21/75* (2013.01); *H04L 9/0631* (2013.01); *H04L 9/14* (2013.01)

(58) Field of Classification Search
CPC .......... G06F 21/70; G06F 21/71; G06F 21/72; G06F 21/75; H04L 9/06; H04L 9/0618; H04L 9/0631; H04L 9/14
See application file for complete search history.

(56) References Cited

U.S. PATENT DOCUMENTS 4,740,891 A * 4/1988 Kirkpatrick .......... G05B 19/045
                                                                    700/12
8,355,499 B2   1/2013 Asnaashari et al.
(Continued)

FOREIGN PATENT DOCUMENTS

GB   2438972 A * 12/2007 ........... G06F 21/558
WO   2017218829 A1   12/2017

OTHER PUBLICATIONS

International Search Report and Written Opinion for the International Patent Application No. PCT/US2020/048380, mailed Feb. 17, 2021, 15 pages.

*Primary Examiner* — D'Arcy Winston Straub
(74) *Attorney, Agent, or Firm* — KDW FIRM PLLC

(57) ABSTRACT

The invention is directed to securing/obfuscating the design and operation of a logic circuit using standard encryption algorithms. The invention transforms the logic of the circuit to crypto logic which is capable of accepting encrypted input, producing encrypted output or a combination of accepting encrypted input and producing encrypted output.

18 Claims, 8 Drawing Sheets

(56) References Cited

U.S. PATENT DOCUMENTS

| | | | |
|---|---|---|---|
| 2002/0013932 A1* | 1/2002 | Liu | G06F 30/367 |
| | | | 716/136 |
| 2009/0178857 A1 | 7/2009 | Yuyama et al. | |
| 2009/0187757 A1* | 7/2009 | Kerschbaum | H04L 9/0833 |
| | | | 713/153 |
| 2015/0071434 A1 | 3/2015 | Eli et al. | |
| 2015/0188661 A1* | 7/2015 | Millican | G06F 30/20 |
| | | | 380/287 |
| 2015/0280907 A1 | 10/2015 | Kocher et al. | |
| 2016/0171249 A1* | 6/2016 | Circello | G06F 21/72 |
| | | | 713/189 |
| 2016/0254912 A1* | 9/2016 | Maniatakos | H04L 9/321 |
| | | | 713/168 |
| 2017/0103236 A1* | 4/2017 | Homayoun, Jr. | G06F 21/87 |
| 2017/0244759 A1 | 8/2017 | Attfield et al. | |
| 2020/0065456 A1* | 2/2020 | Tehranipoor | G06F 21/14 |
| 2020/0244435 A1* | 7/2020 | Shpurov | G06F 21/64 |

* cited by examiner

| Input | Output | | Input | Output | | Input | Output | | Input | Output | | Input | Output |
|---|---|---|---|---|---|---|---|---|---|---|---|---|---|
| 000 | 1011 | | 100 | 0101 | | 000 | 0101 | | 100 | 1011 | | 000 | 1111 |
| 001 | 0000 | | 101 | 1010 | | 001 | 1010 | | 101 | 0000 | | 001 | 1001 |
| 010 | 1010 | | 110 | 0011 | | 010 | 0011 | | 110 | 1010 | | 010 | 1010 |
| 011 | 0101 | | 000 | 1111 | | 011 | 1111 | | 000 | 0101 | | 011 | 1111 |
| 100 | 0000 | | 001 | 1001 | | 100 | 1001 | | 001 | 0000 | | 100 | 1011 |
| 101 | 1111 | | 011 | 1000 | | 101 | 1000 | | 011 | 1111 | | 111 | 1111 |
| 110 | 0101 | | 111 | 1100 | | 110 | 1100 | | 111 | 0101 | | 110 | 0101 |
| 111 | 0101 | | 010 | 1011 | | 111 | 1011 | | 010 | 0101 | | 101 | 0101 |
| (a) | | | (b) | | | (c) | | | (d) | | | (e) | |

*FIG. 1*

| Current state | Inputs | | | | | | | | | Next state | | | Outputs (in the clear) | | | | | | | | | |
|---|---|---|---|---|---|---|---|---|---|---|---|---|---|---|---|---|---|---|---|---|---|---|
| WAITING | 0 | 0 | 0 | 0 | x | x | x | x | x | 0 | 0 | 0 | 0 | 0 | 0 | 0 | 0 | 0 | 0 | 0 | 0 | 1 |
|  | 0 | 0 | 0 | 1 | x | x | x | x | x | 0 | 0 | 1 | 0 | 0 | 0 | 0 | 1 | 1 | 0 | 0 | 1 | 1 |
| DECIDING | 0 | 0 | 1 | x | 0 | x | x | x | x | 0 | 1 | 1 | 0 | 0 | 1 | 1 | 0 | 0 | 0 | 0 | 0 | 0 |
|  | 0 | 0 | 1 | x | 1 | x | x | x | x | 0 | 1 | 0 | 0 | 0 | 1 | 1 | 0 | 0 | 0 | 0 | 0 | 0 |
| OFFSETTING | 0 | 1 | 0 | x | x | 0 | x | x | x | 0 | 1 | 0 | 0 | 0 | 1 | 1 | 0 | 1 | 0 | 0 | 0 | 0 |
|  | 0 | 1 | 0 | x | x | 1 | x | x | x | 0 | 1 | 0 | 0 | 0 | 1 | 1 | 0 | 1 | 0 | 1 | 0 | 0 |
|  | 0 | 1 | 1 | x | x | x | 0 | 0 | x | 0 | 1 | 1 | 0 | 0 | 1 | 1 | 1 | 0 | 0 | 1 | 0 | 0 |
| RUNNING | 0 | 1 | 1 | x | x | x | 0 | 1 | x | 1 | 0 | 0 | 0 | 0 | 1 | 1 | 1 | 0 | 0 | 0 | 0 | 0 |
|  | 0 | 1 | 1 | x | x | x | 1 | 0 | x | 0 | 1 | 1 | 0 | 0 | 1 | 1 | 1 | 0 | 0 | 0 | 1 | 0 |
|  | 0 | 1 | 1 | x | x | x | 1 | 1 | x | 1 | 0 | 0 | 0 | 0 | 1 | 1 | 1 | 0 | 0 | 0 | 1 | 0 |
| IDLE | 1 | 0 | 0 | x | x | x | x | x | x | 0 | 0 | 1 | 0 | 0 | 0 | 0 | 0 | 0 | 0 | 0 | 0 | 0 |
| LOCKED | 1 | 0 | 1 | x | x | x | x | x | 0 | 0 | 0 | 0 | 0 | 0 | 0 | 0 | 0 | 0 | 0 | 0 | 0 | 0 |
|  | 1 | 0 | 1 | x | x | x | x | x | 1 | 1 | 1 | 0 | 0 | 0 | 0 | 0 | 0 | 0 | 0 | 0 | 0 | 0 |
| READ | 1 | 1 | 0 | x | x | x | x | x | x | 0 | 0 | 0 | 0 | 0 | 0 | 0 | 0 | 0 | 0 | 0 | 0 | 0 |

(a)

| Current state | Inputs | | | | | | | | | Next state | | | Encrypted outputs | | | | | | | | | |
|---|---|---|---|---|---|---|---|---|---|---|---|---|---|---|---|---|---|---|---|---|---|---|
| WAITING | 0 | 0 | 0 | 0 | x | x | x | x | x | 1 | 1 | 1 | 0 | 0 | 0 | 0 | 1 | 1 | 1 | 1 | 1 | 1 |
|  | 0 | 0 | 0 | 1 | x | x | x | x | x | 0 | 1 | 1 | 1 | 0 | 0 | 1 | 0 | 1 | 0 | 1 | 0 | 0 |
| DECIDING | 0 | 0 | 1 | x | 0 | x | x | x | x | 0 | 1 | 1 | 0 | 1 | 1 | 1 | 1 | 0 | 0 | 0 | 1 | 1 |
|  | 0 | 0 | 1 | x | 1 | x | x | x | x | 1 | 1 | 1 | 0 | 0 | 0 | 0 | 0 | 1 | 0 | 0 | 0 | 1 |
| OFFSETTING | 0 | 1 | 0 | x | x | 0 | x | x | x | 0 | 0 | 1 | 1 | 0 | 1 | 0 | 1 | 1 | 1 | 1 | 1 | 0 |
|  | 0 | 1 | 0 | x | x | 1 | x | x | x | 1 | 0 | 1 | 0 | 0 | 0 | 0 | 0 | 1 | 0 | 1 | 1 | 1 |
|  | 0 | 1 | 1 | x | x | x | 0 | 0 | x | 0 | 1 | 1 | 1 | 1 | 1 | 0 | 0 | 1 | 0 | 1 | 1 | 0 |
| RUNNING | 0 | 1 | 1 | x | x | x | 0 | 1 | x | 1 | 1 | 0 | 1 | 0 | 0 | 0 | 0 | 0 | 0 | 1 | 1 | 0 |
|  | 0 | 1 | 1 | x | x | x | 1 | 0 | x | 0 | 1 | 1 | 1 | 0 | 0 | 0 | 0 | 0 | 1 | 1 | 1 | 0 |
|  | 0 | 1 | 1 | x | x | x | 1 | 1 | x | 0 | 1 | 1 | 1 | 1 | 0 | 0 | 0 | 0 | 1 | 0 | 1 | 0 |
| IDLE | 1 | 0 | 0 | x | x | x | x | x | x | 1 | 1 | 0 | 1 | 1 | 0 | 0 | 1 | 0 | 0 | 0 | 0 | 0 |
| LOCKED | 1 | 0 | 1 | x | x | x | x | x | 0 | 1 | 0 | 0 | 1 | 1 | 0 | 1 | 0 | 0 | 1 | 1 | 0 | 0 |
|  | 1 | 0 | 1 | x | x | x | x | x | 1 | 1 | 0 | 0 | 1 | 1 | 1 | 1 | 1 | 1 | 0 | 0 | 0 | 1 |
| READ | 1 | 1 | 0 | x | x | x | x | x | x | 0 | 0 | 0 | 1 | 0 | 1 | 1 | 0 | 1 | 0 | 0 | 0 | 1 |

METHOD FOR SECURING LOGIC CIRCUITS

RELATED APPLICATIONS

This application is a national phase filing under 35 U.S.C. § 371 claiming the benefit of and priority to International Patent Application No. PCT/US2020/048380, filed Aug. 28, 2020, which claims the benefit of U.S. Provisional Patent Application No. 60/922,828, filed Aug. 29, 2019, the contents of which are incorporated herein in their entireties.

BACKGROUND OF THE INVENTION

Today's semiconductor industry is truly global in that logic circuits are designed, fabricated, and tested in various parts of the world. For example, it is not uncommon to design a chip on the west coast of the United States that incorporates intellectual property (IP) created from around the world, that is fabricated in Taiwan or Korea, and tested and packaged in Malaysia before finally being shipped back to the owner in the United States. This state of the semiconductor industry has been true for a number of years. However, the situation has become more acute given the clustering of state-of-the-art fabrication capabilities shifting to South-East Asia. For the U.S. government, this is particularly problematic because next-generation electronics for national defense must meet power, performance and area (PPA) constraints that are not easily satisfied on shore in an economic fashion. Moreover, government requirements for security clearances, safeguarding all aspects of design, fabrication and test, coupled with chip volumes that are orders of magnitude less than major chip producers greatly exacerbates the problem. As a result, the U.S. government has been sponsoring a variety of research directed to enabling the "secure" fabrication of sensitive government electronics off-shore. It should also be noted that non-government entities are also keenly interested in this topic due to their desire to protect sensitive IP that provides a market advantage.

There is only one company in the United States that continues to scale CMOS technology. Due to this limited capacity, many chip design houses are opting to utilize the global supply chain to bring their designs to fruition. Specifically, large chip producers are utilizing third-party IP, accompanied by fabrication, testing and packaging that is accomplished not only outside the walls of their own company, but likely outside the borders of the United States. Inherent to this global supply chain are a number of threats that include malicious modification of the design through third-party IP or fabrication, overproduction for illegitimate sells, reverse engineering for IP theft, etc. These threats are especially acute for the U.S. government and sensitive industries (e.g., high-speed trading) where maintaining confidentially is of the utmost importance. As a result, there is a significant need to protect both the design intent and the functionality of all or certain logic operation within a System-on-a-Chip (SoC).

There are two major threats associated with fabricating logic circuits overseas. First, there is the concern that a malicious actor may alter a design to affect its function or reliability, and/or to leak information after deployment to the malicious party.

The second major concern is the theft of the sensitive IP inherent in the design. Fabrication requires transferring a complete design description to the manufacturer. This means the manufacturer or any party with access to the released design can analyzed it using a number of known reverse-engineering techniques. Research over the last ten plus years has focused on these two concerns and many other issues related to the semiconductor global supply chain.

The focus of the present invention is directed to addressing the second problem, namely, leakage of IP due to reverse engineering. As mentioned, there has been a significant amount of research over the last decade on securing the semiconductor global supply chain. For IP leakage, methods of "locking" a circuit have been proposed. Locking a circuit involves modifying it so that it does not operate properly without a secret key input applied. This method was quickly shown to be easily "cracked", that is, the secret key could easily be uncovered by analyzing the design alone, or with the help of an unlocked, working circuit (typically called an oracle). Subsequently, a plethora of new locking techniques have been introduced.

Correspondingly, there have been a new set of attacks that have clearly demonstrated that presently-known locking techniques are not effective. This state of affairs is being met with more ad-hoc approaches to locking logic. Existing techniques and their future successors are very unlikely to accomplish the desired goal because all of them, to date, lack a mathematical foundation that proves soundness with respect to some metric of security.

SUMMARY OF THE INVENTION

The invention uses encryption algorithms for securing/obfuscating the design of a logic circuit. The invention recognizes that logical operations can be described in multiple ways, including for example: programming languages, high-level description languages (HDLs) such as Verilog and VHDL, structural netlist of gate-level functions, Boolean expressions, and truth tables. The logic circuit to be protected is designed in such a way that, in various embodiments, it may (a) take encrypted or partially encrypted input; (b) produce encrypted or partially encrypted output; or (c) a combination of accepting encrypted or partially encrypted input and/or producing encrypted or partially encrypted output. A logic circuit in accordance with the invention that is capable of accepting encrypted input or producing encrypted output is referred to herein as "crypto logic". In various embodiments, input may be encrypted, or encrypted output may be decrypted using any encryption algorithm. Implementation of the invention is aided by the fact that an encryption capability is typically already present in an integrated circuit (IC) in which the logic circuitry is embodied. The invention is advantageous for various platforms, including but not limited to, cloud computing, general program computing (server, desktop, CPU, GPU, etc.), programmable hardware (e.g., field-programmable gate arrays), and logic circuits within SoCs, ASICs, etc. The invention differs substantially from previous approaches to hardware security (e.g., logic locking) by the direct use of proven encryption algorithms.

BRIEF DESCRIPTION OF THE DRAWINGS

FIG. 1 shows the effect of various embodiments of the invention on an exemplary truth table (a), showing embodiments wherein both inputs and outputs are encrypted (b), only the output is encrypted (c), only the input is encrypted (d), and wherein either inputs or outputs may be partially encrypted (e).

FIG. 8 shows a state table description of an FSM controller for a GPS in clean form and table (a) and as encrypted in accordance with the invention in table (b).

DEFINITIONS

Figure 2:
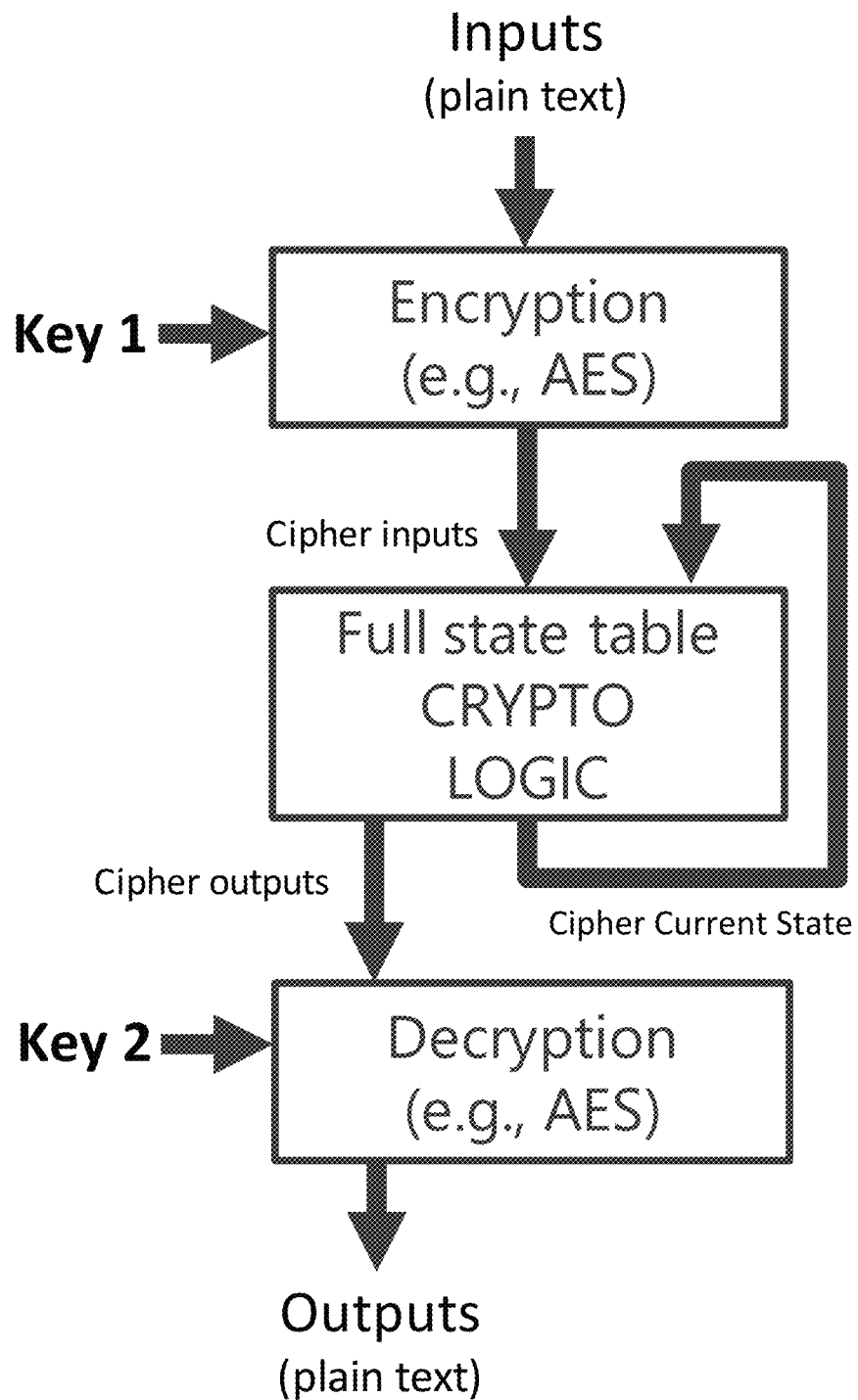
FIG. 2 is a block diagram of an embodiment of the invention wherein both inputs and outputs to the crypto logic are encrypted.

Logic Transfer Function—As used herein, this term is defined as the relationship between the inputs to a logic circuit and the outputs from a logic circuit, given a current state of the logic circuit.

Plaintext—This term refers to the unencrypted inputs to a logic circuit or decrypted outputs from a logic circuit, including any internally stored persistent state of the logic circuit. This term is not meant to imply that the inputs to or outputs from the logic circuit are in any way limited to text or representations of text.

As used herein, the terms current state and stored state refer to a persistent state produced by a given input to the logic circuit given the current state of the logic circuit, which produces an output and a next state, the next state becoming the current or stored state for the next input.

DETAILED DESCRIPTION

A logic circuit may be defined in terms of a logic transfer function. The logic transfer function defines the relationship between a given input to the logic circuit and the output produced by the logic circuit. The inputs to the logic circuit may comprise, for example, a string of bits of length $I_n$, while the outputs from the logic circuit may comprise a string of bits of length $O_m$. When implemented in hardware, the inputs to and outputs from the logic circuit may be, for example, pins on an integrated circuit. The logic circuit may be capable of storing a state which persists between applications of various inputs, for example, from one input to the next input. The state may comprise, for example, values stored in registers within the integrated circuit or in the memory of a computer. The logic transfer function may utilize the stored state to determine the output of the logic circuit and the next stored state of the logic circuit produced for a given input and a given current state of the logic circuit. As such, identical inputs applied to the logic circuit may produce different outputs, depending on the current, stored state of the logic circuit.

As previously stated, the key insight of the invention is that the logic transfer function can be described in multiple ways, including for example: programming languages, high-level description languages (HDLs) such as Verilog and VHDL, structural netlist of gate-level functions, Boolean expressions, and truth tables. HDLs are the most ubiquitous in that most designs have to be described at this abstraction level to facilitate the rest of the design process that includes integration with third-party IP, synthesis, place-and-route, etc. Truth tables, on the other hand, are archaic and are not used at all except under the most rudimentary circumstances (e.g., instruction of basic logic operation).

Truth tables, however, are expressed in the form of data, i.e., 1s and 0s, and data can be encrypted. Consider a truth table description of any logic function, as shown, for example, in FIG. 1(a). The left side of the table typically captures all possible combinations of input values (i.e., for N inputs there are $2^N$ rows in the truth table representing all possible combinations of input values). For each input combination there is a corresponding a set of M outputs on the right side of the table. Unlike the left-hand side, the output side does not have to include all $2^M$ possible output combinations, and typically does not.

Data encryption algorithms work with a string of data. For example, the Advanced Encryption Standard (AES) algorithm encrypts data 128, 192 or 256 bits at a time, depending on the size of the key. These string sizes are deliberate in that they all are multiples of eight, allowing for the encryption of 16, 24, and 32 8-bit ASCII characters. It is unlikely a truth table will have data in multiples of eight bits, and it is more unlikely that data in the truth table is a collection of ASCII characters. However, a truth table can easily be viewed as a set of ASCII characters with any leftover bits simply being padded to reach a multiple of eight. But how should the truth table be viewed as ASCII data? There are two obvious choices, namely, column-wise or row-wise. Column-wise is an obvious choice given that the number of columns grows linearly with the number of inputs N, and the number of rows grows exponentially with N, meaning that the ratio of ASCII characters to padding will be larger for columns than rows. However individual columns are meaningless for describing the functionality captured by a truth table. Each truth-table row represents an atomic operation of the logic. That is, given the inputs designated on the left-hand side of the table, the outputs on the right side of the table will be produced regardless of past behavior. This is true for both truth tables (combinational circuits) and state tables (sequential circuits). Consequently, encryption applied to one or more truth table rows is the most intuitive.

The level of encryption applied to a given truth table defining the logic transfer function of the logic circuit leads to alternative embodiments of the invention. Specifically, in various embodiments of the invention, encryption can be applied to both the left and right sides of the table, as shown in FIG. 1(b), to one or the other side of the table, as shown in FIG. 1(c) (output side) and FIG. 1(d) (input side) and to only portions of the table, as shown in FIG. 1(e). These various embodiments will now be discussed.

INPUT-OUTPUT (I/O) CRYPTO LOGIC. In this embodiment of the invention, the full truth table is encrypted one row at a time. An exemplary truth table for this embodiment is shown in FIG. 1(b). Each row is viewed as data in the clear that is encrypted. This means both the input data, the output data, and, consequently, the functions described by the truth table are obfuscated via encryption. The encrypted table can be synthesized to create an input-output (I/O) crypto logic circuit. Operating an I/O crypto logic circuit requires inputs to the logic circuit to be encrypted and outputs from the logic circuit to be decrypted. This requirement has different implementation implications with respect to the computing platform (software, instruction-set architecture (ISA), field-programmable gate array (FPGA), system-on-chip (SoC), etc.) which are discussed later. A block diagram of this embodiment is shown in FIG. 2.

Figure 3:
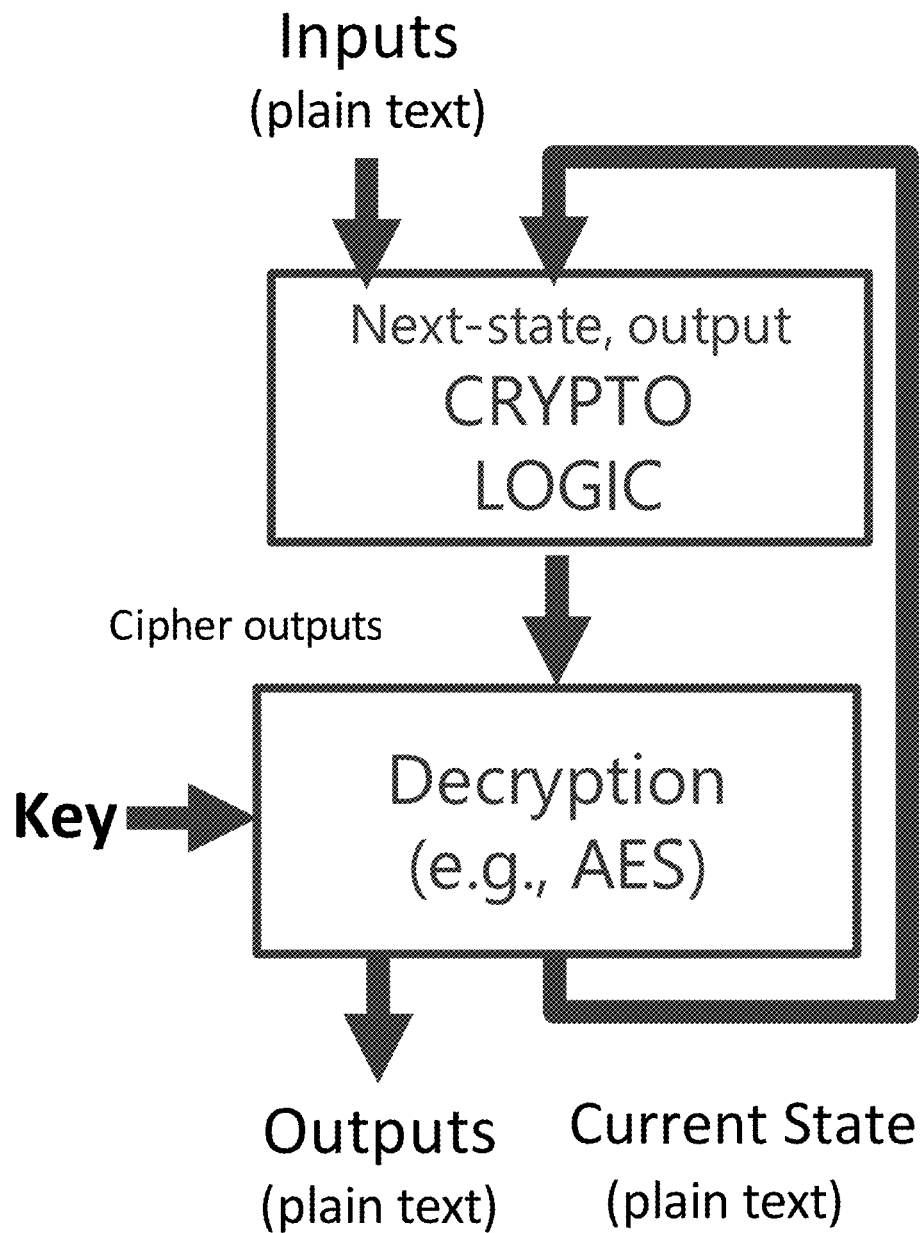
FIG. 3 is a block diagram of an embodiment of the invention wherein the crypto logic produces encrypted output.

OUTPUT CRYPTO LOGIC. In this embodiment, the truth table is encrypted, one row at a time, but only the output side of the table is encrypted. An exemplary truth table for this embodiment is shown in FIG. 1(c). When an output encrypted table is synthesized to create an output crypto logic circuit, plaintext inputs are applied and the logic circuit produces encrypted outputs that require decryption to be useful. Like Input-Output crypto logic, output crypto logic has different implementation implications depending on the computing platform. A block diagram of this embodiment is shown in FIG. 3.

INPUT CRYPTO LOGIC. This embodiment is the counterpart of output crypto logic, that is, the truth table is encrypted one row at a time, but only the input side of the table is encrypted. As such, encrypted inputs are applied and the logic circuit produces plaintext outputs. Application of plaintext inputs to the logic circuit would result in meaningless output. An exemplary truth table for this embodiment is shown in FIG. 1(d). Like the two prior forms of crypto logic, there are different implications depending on the computing platform used to implement input crypto logic. A block diagram of this embodiment is shown in FIG. 4.

SPARSE CRYPTO LOGIC. In this embodiment, only certain rows of the truth table are encrypted. In sparse crypto logic, there are three sub-categories based on whether inputs and/or outputs are encrypted, or either one or the other—namely, sparse-input-output, sparse-output, and sparse-input. These forms of crypto are useful when only subsets of the data/functionality require protection and obfuscation. Finally, like the other forms of crypto logic, the implementation implications are distinct for different computing platforms. An exemplary truth table for this embodiment is shown in FIG. 1(e) and can be implemented by any of the embodiments shown in block form in FIGS. 2-4.

Crypto logic can be used to obfuscate both the design intent and the operation of its logic circuitry. Like the different forms of crypto logic, there are many implementation variants. The most appropriate embodiment depends on the needs of the user.

Figure 4:
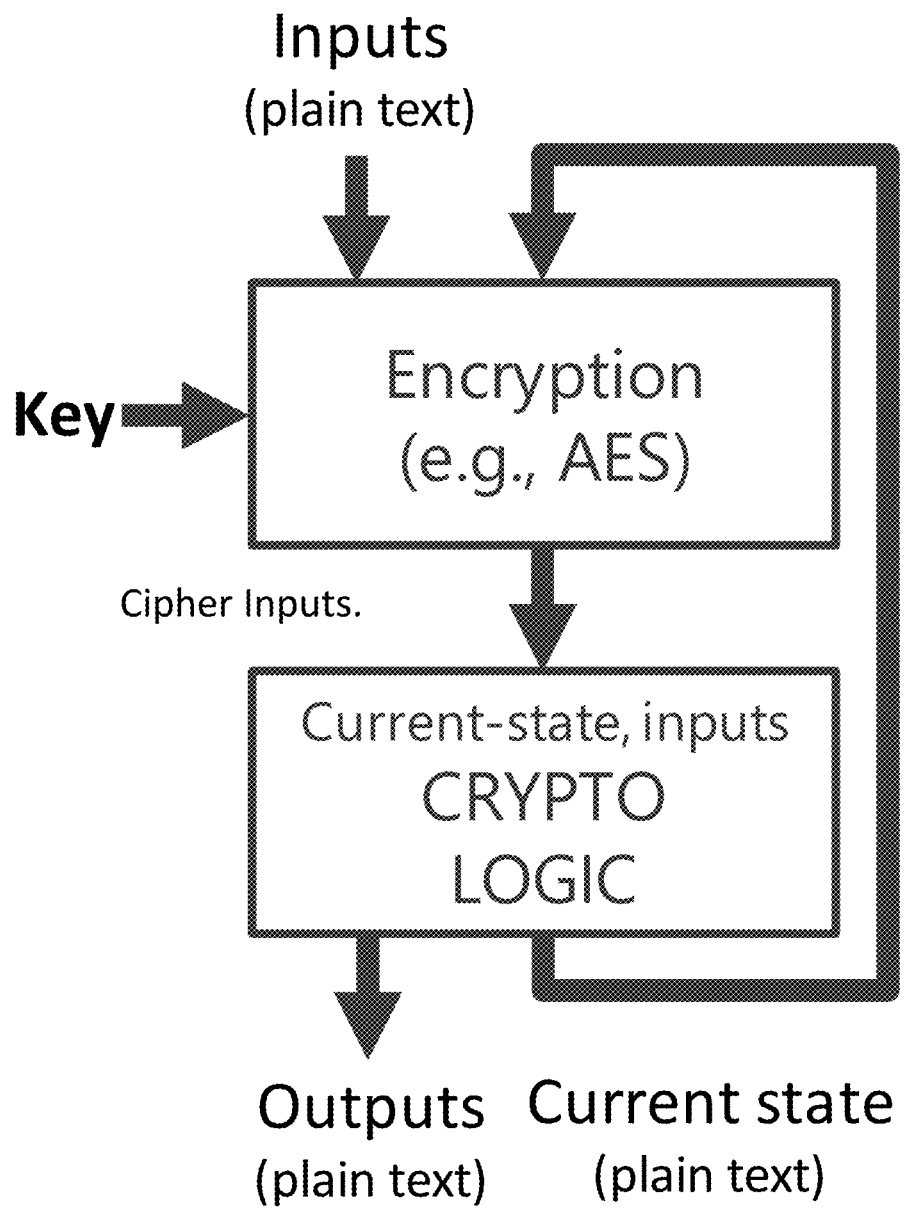
FIG. 4 is a block diagram of an embodiment of the invention wherein the crypto logic accepts encrypted input.

FIGS. 2-4 depict the idea behind various embodiments of crypto logic. Any strong cipher may be used, however, in preferred embodiments of the invention the AES cipher is used.

In the embodiment of FIG. 2, plaintext inputs are encrypted with a first key using the selected cipher to produce cipher inputs which are input to the crypto logic. The crypto logic produces cipher outputs and a cipher current state which is then fed back into the crypto logic. The cipher outputs are then decrypted using a second key using the selected cipher. Variations of this embodiment include an embodiment wherein the crypto logic produces a plaintext current state which must be encrypted before being used and an embodiment wherein the crypto logic produces an encrypted current state which must be decrypted before being used.

In the embodiment shown in FIG. 3, the inputs are received in plaintext form and are input to the crypto logic. The crypto logic produces cipher outputs and a cipher current state using the selected cipher. The cipher outputs and cipher current state are decrypted using a key and the selected cipher to produce plaintext outputs and a plaintext stored state. The plaintext stored state is fed back into the crypto logic in plaintext form.

In the embodiment shown in FIG. 4, plaintext inputs and a plaintext current state are encrypted using the selected cipher to produce cipher inputs and a cipher current state. The cipher inputs and cipher current state are then input to the crypto logic, which produces plaintext outputs as well as a plaintext stored state, which is fed back into the system as the stored state.

Note that, for any of the embodiments shown in FIGS. 2-4, a sparse crypto logic embodiment may be utilized where only a portion of the inputs are encrypted, only a portion of the outputs are encrypted, or a combination wherein portions of both the inputs and the outputs are encrypted.

Forming the crypto logic is a straightforward process. It should be noted, however, that the process described here is not the only process to accomplish crypto logic because the important idea is to encrypt/decrypt the data description of a logic circuit using a sufficient cipher. Here we describe a counter mode of encryption because it has a number of advantages that maximizes the efficiency of synthesis and is compatible with the intrinsic operation of digital logic. It should be noted that the counter mode of operation is only one possible mode of operation and that other modes of operation are possible and are still within the scope of the invention. The invention is not meant to be limited to embodiments using the counter mode.

Figure 5:
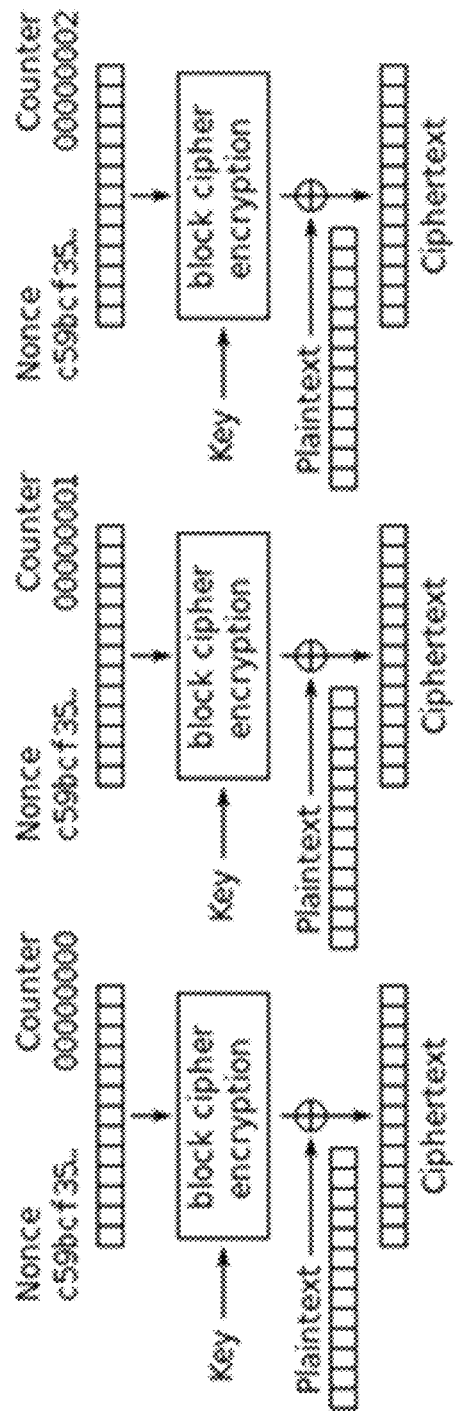
FIG. 5 is an example of an embodiment of the invention using a counter mode.

The counter mode of encryption is illustrated in FIG. 5. This mode of encryption is very advantageous because it allows decryption in a random-access fashion. That is, unlike cipher block chaining (CBC) and other modes of encryption, individual blocks of data (i.e., stored state and outputs) can be decrypted with a high-level of security without including other cipher blocks (i.e., other stored state and outputs). A simple description of the counter mode follows. In the counter mode, a number which is only used once (referred to as a "nonce") is combined with a counter that is encrypted using the cipher and a secret key. The nonce and counter do not all need to be secret or random but they should only be used once to ensure security.

Typically, the counter and nonce are combined (e.g., added) to form a unique identifier for the block of data to be encrypted. In this example, the input pattern to the logic circuit is used as the counter and some random value is assigned to be the nonce. This easily allows transmission of the counter to the AES unit for decryption. The nonce can simply be stored in a register (or in the case of all-zero nonce can simply be easily OR'ed with the counter).

In FIG. 5, the plaintext is the logic-circuit data. As mentioned, this data consists of the stored state and output logic but could also easily include some or all of the inputs, data path, cache, memory, etc., of a complete SoC design. Block ciphers, such as AES (other ciphers such as stream ciphers can be used as well) encrypt blocks of a fixed size. In AES, the block size matches the key size, which for AES can be 128, 192, or 256 bits. It is unlikely, however, that the number of stored state and outputs of the logic circuit is an integral multiple of block size. This need not be an issue for the counter mode of encryption. During the design of the crypto logic, one has to only choose a number of cipher blocks that is equal to or exceeds the number of stored state and primary outputs. Any cipher outputs that exceed the number of stored state and primary outputs can be ignored. Note that this can also be exploited to enter "don't cares" for a given table entry. This produces encrypted logic circuit data in the form of a succinct state table that includes all the "don't cares" that the original state table contained. This is an important advantage of the counter mode because it allows synthesis to exploit the "don't cares" for power, performance and area optimization, allowing the opportunity for the crypto logic to be as efficient as the unencrypted, original logic. The resulting crypto logic for every possible input will produce crypto outputs (stored state, primary outputs, etc.) That do not reveal any information about the functionality of the circuit.

Figure 6:
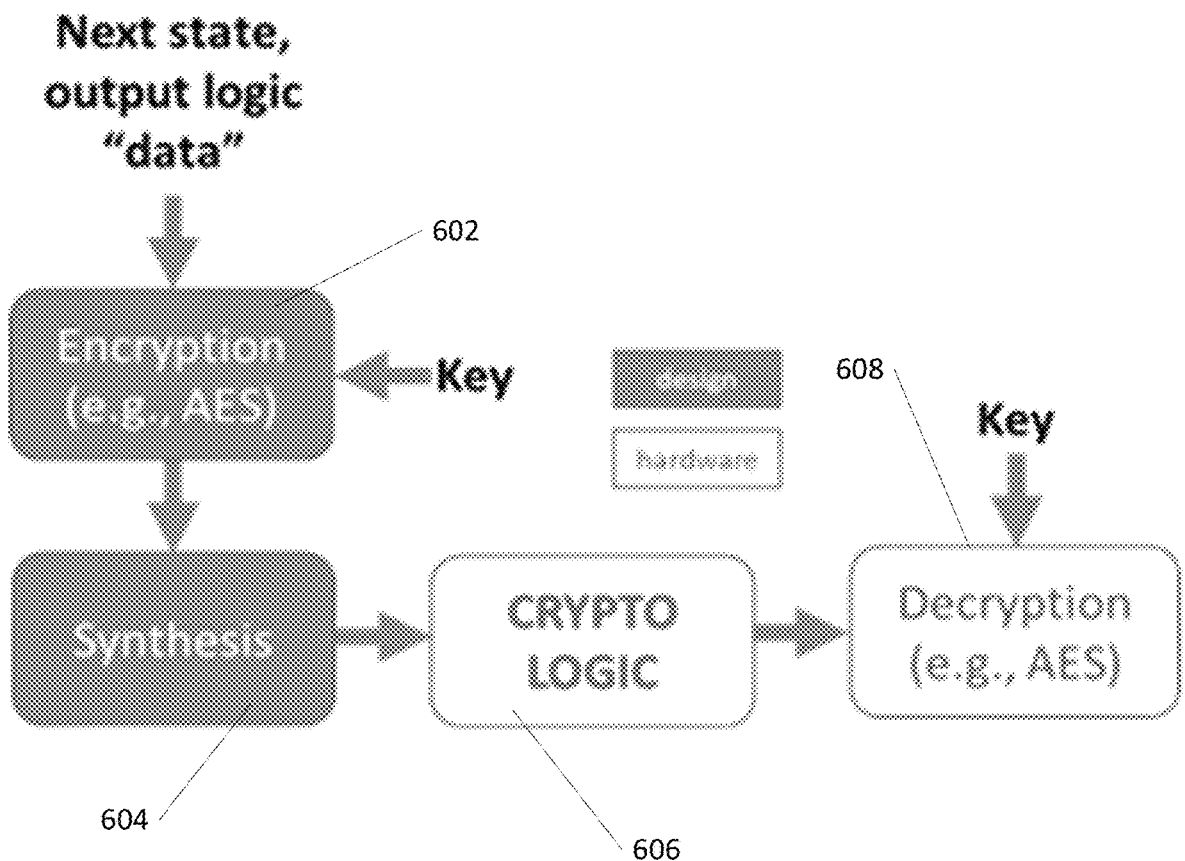
FIG. 6 is a block diagram illustrating the design process for crypto logic.

FIG. 6 illustrates the design process for crypto logic. The shaded blocks are design steps executed in software, and the unshaded blocks are the resulting hardware required for the crypto logic. For the counter mode, the nonce+counter are encrypted using the chosen cipher at 602 and then XORed with the stored state and output data (one state table entry at a time) to produce cipher outputs. As mentioned, the unshaded blocks in FIG. 6 represent the hardware needed to use the crypto logic. The first block 606 is the crypto logic that results from synthesis in block 604 as describe earlier. The second block 608 is an ordinary encryption hardware block (or software if the application is insensitive to the extra delay), that is, no modifications are necessary for use with crypto logic. This is very advantageous because many complex ICs (i.e., SOCs, microprocessors and FPGAs) typically contain a hardware implementation of the cipher (e.g., AES). As such, no significant overhead is incurred for this design methodology for securing hardware. Moreover, there is an interesting tradeoff that exists between latency and the chip area for the cipher block. Referring to FIG. 5, the decryption process (which is the opposite of encryption) can be initiated at the same time as input is applied to the crypto logic. This means that the crypto logic and decryption can be designed such that performance and latency are optimized. Even for the case wherein the logic circuit requires multiple blocks beyond the key size, optimization for performance can be accomplished by having multiple cipher blocks operating in parallel. Alternatively, in the case that the decryption process is faster than the crypto logic, multiple encryption blocks may not be necessary. On the other hand, if performance is less important than area and delay/latency is not an issue, then a single cipher block in hardware can be used instead at the expense of performance. That is, the production of the clear stored state and output values will be delayed until the decryption process is completed. Finally, it should be noted that if the circuit data is limited, the decryption can simply be implemented in the form of a lookup table or translation logic that is later programmed after chip fabrication. Alternatively, the stored the state table can be implemented in the clear after fabrication using the programmable lookup table and/or configurable fabric.

Figure 7:
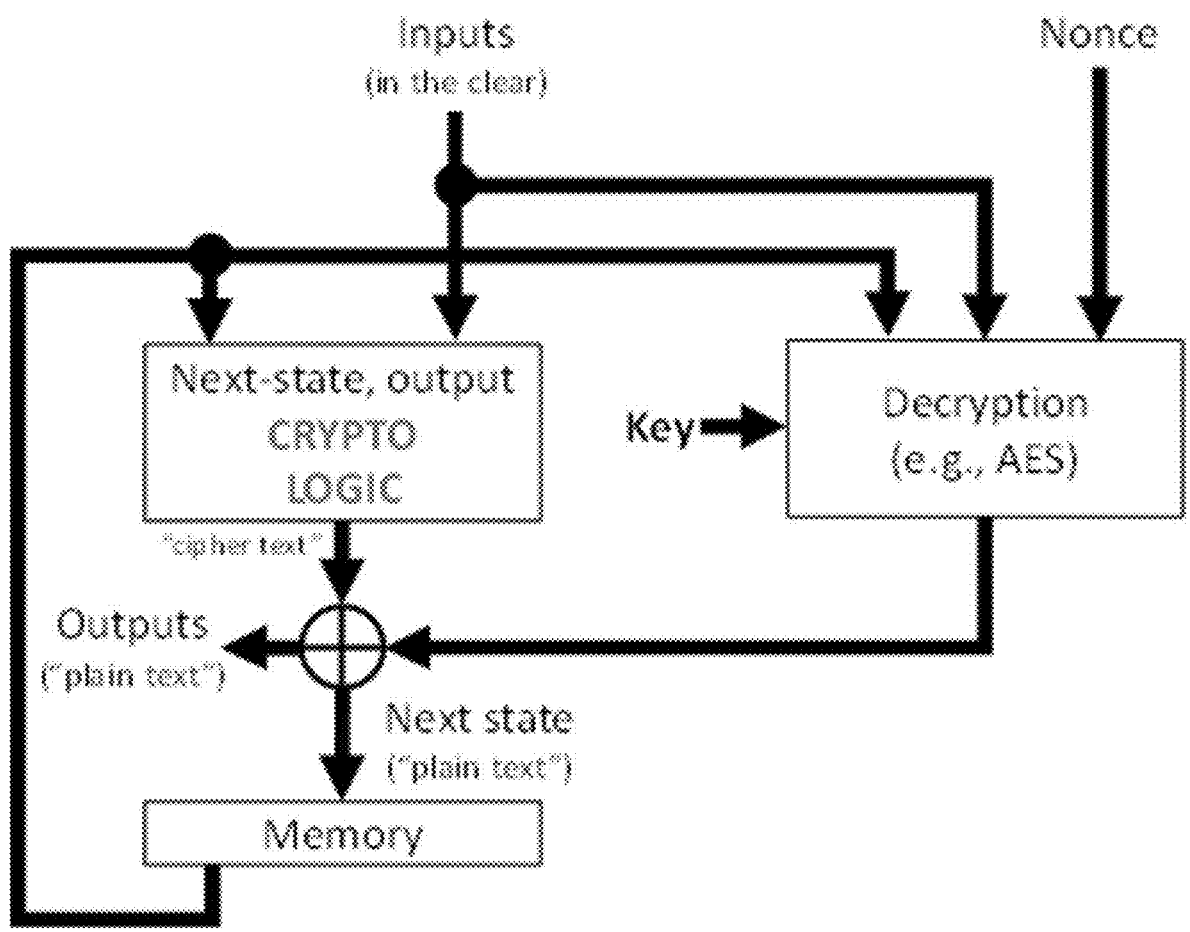
FIG. 7 is a block diagram illustrating the method by which crypto logic can be used with a fast hardware implementation of an encryption block using a single-cycle hardware-based AES operated in the counter mode.

FIG. 7 illustrates how crypto logic can be used with a fast hardware implementation of an encryption block such as AES using a single-cycle hardware-based AES operated in the counter mode. For a given input and current state, the crypto logic produces a cipher of the stored state and outputs. Simultaneously, the AES block is provided with the input which is combined with the nonce to produce the decryption output. The decrypted output is then XORed with the cipher text from the crypto logic to produce the plaintext stored state and primary output values. Note that, if the outputs of the crypto logic are less than the cipher block size, then any outputs of the decryption logic and the corresponding parity gates can be eliminated (if not required for any other uses on the chip) or ignored.

To further explain the invention, an example application is provided. Table (a), shown in FIG. 8, shows a state table description of an FSM controller for a GPS correlator. Not included in the state table description, which is typical, is a description of the correlator data path logic (LFSR, counter, comparator, etc.). Those items can be added, however, at the expense of making the table much larger, or alternatively can be converted to crypto logic separately, with the same and/or different nonce and key. Table (b) shows the stored state and output encrypted using AES in the counter mode with a 128-bit key, in this example, using a key of "0123456789ABCDEF0123456789ABCDEF$_{16}$" and initial nonce of "A0000000000000000000000000000000$_{16}$".

Because the GPS controller of Table 1 only has 12 outputs (i.e., three hexadecimal digits) only 12 outputs of the AES unit are required to decipher the encrypted outputs from the crypto logic via a 12-bit XOR word gate. The outputs of the word gate produce the stored state and primary outputs in the clear.

Without the correct key for AES decryption, the crypto logic will produce nonsense. Further, to uncover the key from the cipher produced by the crypto logic is the equivalent of breaking AES. Moreover, some of the concerns typically associated with the counter mode of operation are not applicable to crypto logic. For example, the counter mode is known to be malleable which means it is possible to transform a ciphertext into another ciphertext that decrypts to a related plaintext. For crypto logic, this would require an adversary to alter the crypto logic, communication, etc. via a Trojan Horse or some other method, which is an issue for any logic and not just crypto logic.

The creation of the crypto logic is fairly straightforward. The truth table defining the logic transfer function is encrypted using the selected encryption algorithm. The truth tables are then synthesized using well-known EDA tools to get the design of the hardware circuit implementing the crypto logic. Alternatively, if the logic circuit is to be implemented in software, the encrypted truth table can be stored in a read-only memory of a computer. In alternate embodiments of the invention, the inputs may be encrypted with one encryption algorithm, while the outputs may be encrypted with a different encryption algorithm. Further, multiple encryption algorithms may be used to encrypt different pieces of the truth table. To synthesize the circuit, the various portions of the truth table would be encrypted with the selected encryption algorithm.

A logic circuit secured with crypto logic has the same security guarantees as the selected cipher(s). This is because the encrypted logic circuit data produced by the crypto logic is identical to what the cipher would produce, which means that uncovering the clear stored state and output values (i.e., the "plaintext") is just as difficult when one does not have the key. Moreover, the secret key that created the cipher text is not embedded in the crypto logic, as is the case with many other logic-locking techniques. Instead, the crypto logic is a short-cut translation of plaintext to cipher text, which, as mentioned, can also be replaced by programmable logic if so desired for PPA reasons. Finally, another characteristic of the crypto logic is that it contains a very small subset of all possible versions of plaintext if the encrypted circuit data is not an integral multiple of cipher block size (e.g., 128 bits). As such, the crypto logic does not have full capability of the cipher and key combination, making uncovering the key that much more difficult.

It should be noted that, in alternate embodiments of the invention, the encryption of plaintext input and the stored state, as well as the decryption of encrypted outputs and next state may be accomplished off-chip in software. Further, in alternate embodiments, the crypto logic itself may be implemented in software.

In further alternate embodiments, depending on the application, a pipelined decryption may be useful. For pipelining, throughput is extremely high but at the cost of an initial latency. An example of an application where pipelining would be useful is when the inputs to the crypto logic are predictable or known a priori.

Encryption algorithms (like AES) perform encryption on fixed blocks such as 128, 192 and 256 bits. If the number of outputs in the crypto logic exceeds the block size, then one obvious solution is simply to add additional decryption logic. Another solution, again depending on the application, is pipelining. If multiple decryptions can be accomplished in the amount of time required by the application, then additional decryptions units for parallelism are not needed.

Crypto logic implementation is not relegated to one type of computing platform. Instead, various platforms are compatible with crypto logic, including, for example, the cloud, programs, field-programmable gate arrays (FPGAs), GPUs, CPUs, SoCs, etc. The various platforms for crypto logic that includes SoCs, CPUs, FPGA, program and the cloud are now discussed.

Examples of implementations of the invention described herein are for purposes of illustration only and are not to be taken as limiting the scope of the invention in any way. The scope of the invention is set forth in the following claims.

I claim:

1. A method of securing a logic circuit having a logic transfer function defining a relationship between one or more inputs to and one or more outputs from the logic circuit, the method comprising:
    modifying the logic transfer function to cause the logic circuit to accept one or more of the inputs in encrypted form, produce one or more of the outputs in encrypted form, or a combination of taking one or more of the inputs in encrypted form and producing one or more of the outputs in encrypted form;
    wherein the logic circuit further comprises a stored state; and
    wherein the one or more inputs comprise a string of input bits and further wherein the one or more outputs comprise a string of output bits, the method further comprising:
    encrypting one or more bits of the string of input bits prior to inputting the string of input bits to the logic circuit;
    decrypting one or more bits of the string of output bits; and
    modifying the logic transfer function to cause the logic circuit to produce the stored state in plaintext form which must be encrypted before being used;
    wherein the logic transfer function is expressed in a programming language, a high-level description language, a structural netlist of gate-level functions, Boolean expressions, or a truth table.

2. The method of claim 1 wherein the logic transfer function has been modified to cause the logic circuit to produce the string of output bits having one or more of the bits in encrypted form, further comprising:
    decrypting the output bits to produce a plaintext output.

3. The method of claim 2, wherein the logic transfer function has been further modified to cause the logic circuit to encrypt the stored state, the method further comprising:
    decrypting the encrypted stored state to produce a plaintext stored state.

4. The method of claim 1 wherein the encrypting of the one or more inputs occurs in hardware.

5. The method of claim 1 wherein the decrypting of the one or more outputs occurs in hardware.

6. The method of claim 1 wherein the encryption of the inputs and/or decryption of the outputs uses the Advanced Encryption Standard algorithm.

7. The method of claim 1, further comprising:
    providing a key to encrypt one or more of the inputs.

8. The method of claim 1, further comprising:
    providing a key to decrypt one or more of the outputs.

9. The method of claim 1 further comprising:
    providing a first key to encrypt one or more of the inputs; and
    providing a second key to decrypt one or more of the outputs.

10. A method of securing a logic circuit having a logic transfer function defining a relationship between one or more inputs to and one or more outputs from the logic circuit, the method comprising:
    modifying the logic transfer function to cause the logic circuit to accept one or more inputs in encrypted form;
    wherein the modified logic transfer function causes the logic circuit to produce the same output as an unmodified version of the logic transfer function would cause the logic circuit to produce using an unencrypted input; and
    wherein the logic transfer function is expressed in a programming language, a high-level description language, a structural netlist of gate-level functions, Boolean expressions, or a truth table.

11. The method of claim 10 wherein the logic circuit has a stored state, the method further comprising:
    modifying the logic transfer function to cause the logic circuit to accept the stored state as an input in encrypted form.

12. The method of claim 10 wherein the logic circuit has a stored state, the method further comprising:
    modifying the logic transfer function to cause the logic circuit to produce the stored state in encrypted form.

13. A method of securing a logic circuit having a logic transfer function defining a relationship between one or more inputs to and one or more outputs from the logic circuit, the method comprising:
    modifying the logic transfer function to cause the logic circuit to produce one or more outputs in encrypted form;
    wherein the one or more outputs, when decrypted, are the same outputs that an unmodified version of the logic transfer function would cause the logic circuit to produce when the same one or more inputs are applied; and
    wherein the logic transfer function is expressed in a programming language or a high-level description language and wherein the logic transfer function is modified to include encryption logic and decryption logic.

14. The method of claim 13 wherein the logic circuit has a stored state, the method further comprising:
    modifying the logic transfer function to cause the logic circuit to accept the stored state as an input in encrypted form.

15. The method of claim 13 wherein the logic circuit has a stored state, the method further comprising:
    modifying the logic transfer function to cause the logic circuit to produce the stored state in encrypted form.

16. A method of securing a logic circuit having a logic transfer function defining a relationship between one or more inputs to and one or more outputs from the logic circuit, the method comprising:
    modifying the logic transfer function to cause the logic circuit to accept one or more of the inputs in encrypted form; and
    modifying the logic transfer function to cause the logic circuit to produce one or more of the outputs in encrypted form;

wherein the one or more outputs, when decrypted, are identical to one or more outputs that an unmodified version of the logic transfer function would cause the logic circuit to produce using one or more unencrypted inputs; and wherein the logic transfer function is expressed in a programming language, a high-level description language, a structural netlist of gate-level functions, Boolean expressions, or a truth table.

17. The method of claim 16 wherein the logic circuit has a stored state, the method further comprising:

modifying the logic transfer function to cause the logic circuit to accept the stored state as an input in encrypted form.

18. The method of claim 16 wherein the logic circuit has a stored state, the method further comprising:

modifying the logic transfer function to cause the logic circuit to produce the stored state in encrypted form.

* * * * *